United States Patent
Chao

(10) Patent No.: US 6,540,648 B1
(45) Date of Patent: Apr. 1, 2003

(54) EXERCISER BIKE

(76) Inventor: Yu-Chao Chao, No. 73-1, Tsao Chung Lane, Lu-Kang Town, Chang-Hua Hsien (TW)

( * ) Notice: Subject to any disclaimer, the term of this patent is extended or adjusted under 35 U.S.C. 154(b) by 304 days.

(21) Appl. No.: 09/643,938
(22) Filed: Aug. 23, 2000
(51) Int. Cl.[7] .............................................. A63B 69/16
(52) U.S. Cl. ..................... 482/57; 280/220; 280/230; 280/233; 280/251; 280/255
(58) Field of Search ....................... 482/51, 57; 74/138, 74/141, 142; 280/212, 214, 236, 230, 234, 233, 256, 253, 252, 251

(56) References Cited

U.S. PATENT DOCUMENTS

| | | | | |
|---|---|---|---|---|
| 4,574,649 A | * | 3/1986 | Seol | 74/138 |
| 5,121,654 A | * | 6/1992 | Fasce | 74/594.2 |
| 6,010,433 A | * | 1/2000 | Chao | 482/57 |
| 6,173,981 B1 | * | 1/2001 | Coleman | 280/253 |
| 6,299,189 B1 | * | 10/2001 | Chao | 280/220 |

* cited by examiner

Primary Examiner—Stephen R. Crow
Assistant Examiner—Tam Nguyen
(74) Attorney, Agent, or Firm—Rosenberg, Klein & Lee

(57) ABSTRACT

An improved exerciser bike includes a frame having a front wheel and a handle for steering the front wheel, and includes two rear wheel axles. Two rear wheels are rotatably secured to the rear wheel axles. Each of the foot supports has a middle portion pivotally coupled to the frame. Two chains are engaged on the ratchet sprocket wheels. Each chain is first connected to a wire element which winds on a pulley and then connected to a resilient element and finally secured to an extension rod of the frame. So, the resilient element's length can be designed to be longer to magnify the restoring force and prolong the life of the resilient element.

3 Claims, 4 Drawing Sheets

EXERCISER BIKE

BACKGROUND OF THE INVENTION

1. Field of the Invention

The present invention relates to an improved exerciser bike, and more particularly to an improved exerciser bike having two treadle-typed driving mechanisms for driving two rear wheels respectively. Also, the resilient element's length can be designed to be longer to magnify the restoring force and to prolong the life of the resilient element.

2. Description of the Prior Art

Everybody knows that exercise is beneficial to our health. Traditional exercising devices such as treadmill and stationary exercising bike are indoor and quite tedious. Therefore, outdoor bicycle and tricycle exercises are more and more popular.

Regarding bicycle, not everyone can ride a bicycle. Basically, a tricycle is easier, safer and more stable than a bicycle. For those persons who are not suitable to ride a bicycle or who cannot ride a bicycle (such as kids, elders, weak patients, etc.), riding a tricycle seems to be a better choice for exercising.

A typical tricycle comprises a front wheel and two rear wheels. The two rear wheels are secured on a rear wheel axle and rotated in concert with the rear wheel axle. The conventional tricycle comprise a single rotary driving mechanism for driving the rear wheel axle such that the two rear wheels will be actuated by the single driving mechanism simultaneously. Because there is no any differential gear system in the rear wheel axle, the tricycle may not be turned left or right easily.

Referring to the U.S. Pat. No. 6,010,433, its title is Exerciser Bike Having Two Driving Mechanisms (briefly called the prior art hereafter). The prior art comprises a frame having a front wheel, two rear wheel and two driving means for driving the rear wheel separately. Each driving means includes a ratchet sprocket wheel secured on the rear wheel, a foot support having a middle portion pivotally coupled to the frame at a pivot shaft and having a first end and a second end, a foot pedal secured on the first end of the foot support, and a chain (connected with a spring) engaged on the ratchet sprocket wheel and having a first end secured to the frame and a second end secured to the second end of the foot support.

However, although this prior art can solve the turning problem of the typical tricycle, it causes another design problem. Because the total length of the chain and spring is fixed, if the chain is longer, the spring must be shorter. Thus, the restoring force of the spring will be decreased. If the chain is shorter, the spring must be longer. Thus, the spring (after pulled) is possible to hit the sprocket wheel. Therefore, while designing the length of the chain and the length of the spring. One of both must be sacrificed.

In addition, when the user's foot presses down the pedal, if the foot support swings a distance, then the spring only extends the same distance. The restoring force of the spring cannot be magnified.

The present invention is provided to obviate the above-described disadvantages of the conventional tricycles.

SUMMARY OF THE INVENTION

The primary objective of the present invention is to provide an improved exerciser bike having two treadle-typed driving mechanisms. In which, by utilizing the special design of pulley and wire element, the length of the resilient element can be designed to be longer. So, the restoring force and the life of the spring can be tripled or magnified.

The second objective of the present invention is to provide an improved exerciser bike having two treadle-typed driving mechanisms for driving the rear wheels respectively and separately and for allowing the improved exerciser bike to be easily turned with the rear wheels. Plus, the repeated up-and-down treading exercising is achieved and the user's body can be kept straight up.

In accordance with the invention, an improved exerciser bike comprises: a frame including a front portion having a front wheel and a handle for steering the front wheel, and including a rear portion having two rear wheel axles; two rear wheels rotatably secured to the rear wheel axles; and two treadle-typed driving means for driving the rear wheels separately; wherein each driving means includes: a one-way ratchet sprocket wheel secured on the rear wheel axles; a foot support having a middle portion pivotally coupled to the frame at a pivot shaft and having a first end and a second end, a pulley being disposed on said second end; a foot pedal secured on the first end of the foot support; and a chain engaged on the ratchet sprocket wheel and having a first end secured to a predetermined point of the foot support and a second end first connected to a wire element which winds on said pulley and then connected to a resilient element and finally secured to an extension rod of the frame, for allowing the rear wheels and the ratchet sprocket wheels to be driven by the foot supports via the chains.

DETAILED DESCRIPTION OF THE PREFERRED EMBODIMENT

Figure 1:
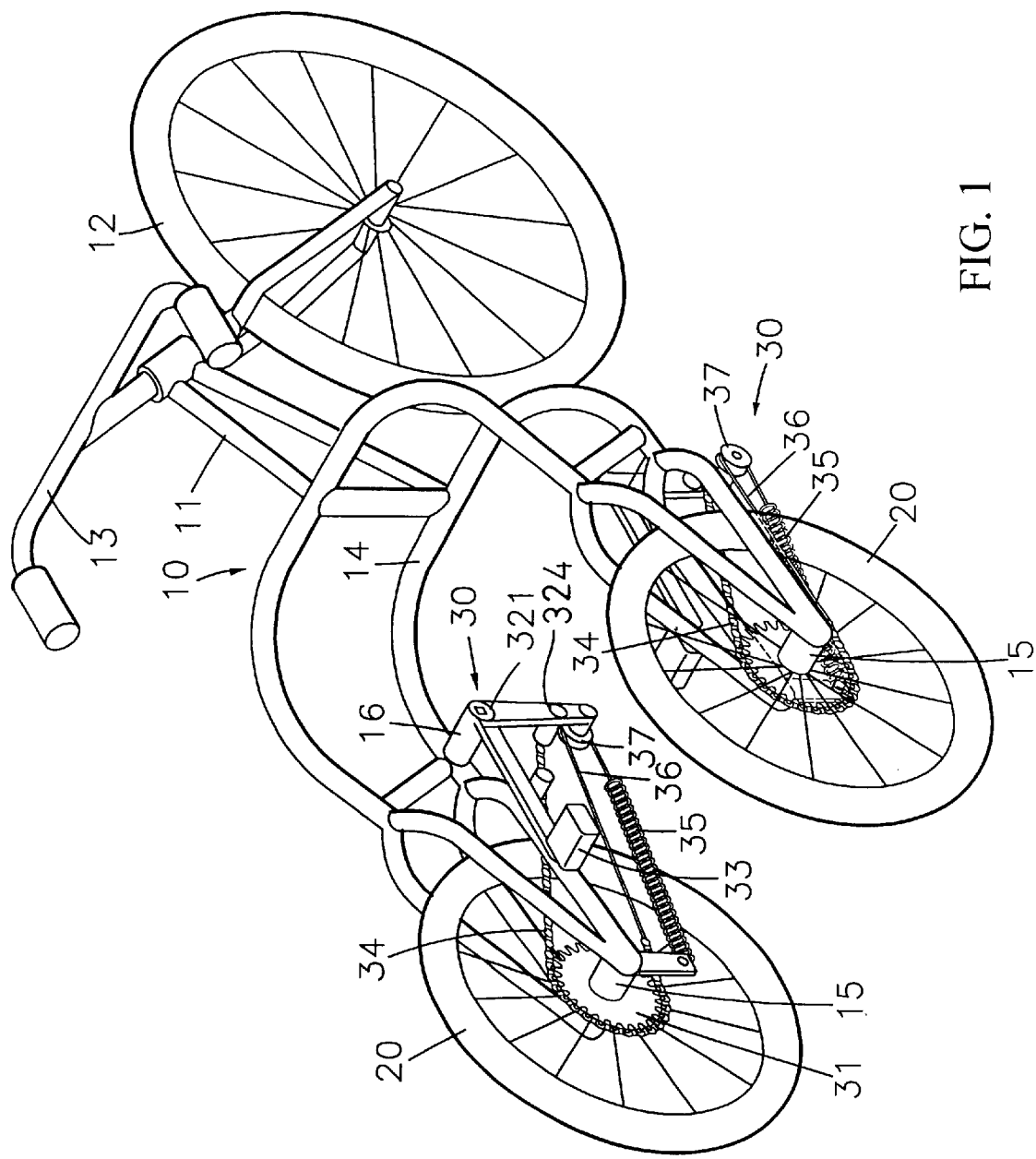
FIG. 1 is a perspective view of an improved exerciser bike in accordance with the present invention.
Figure 2:
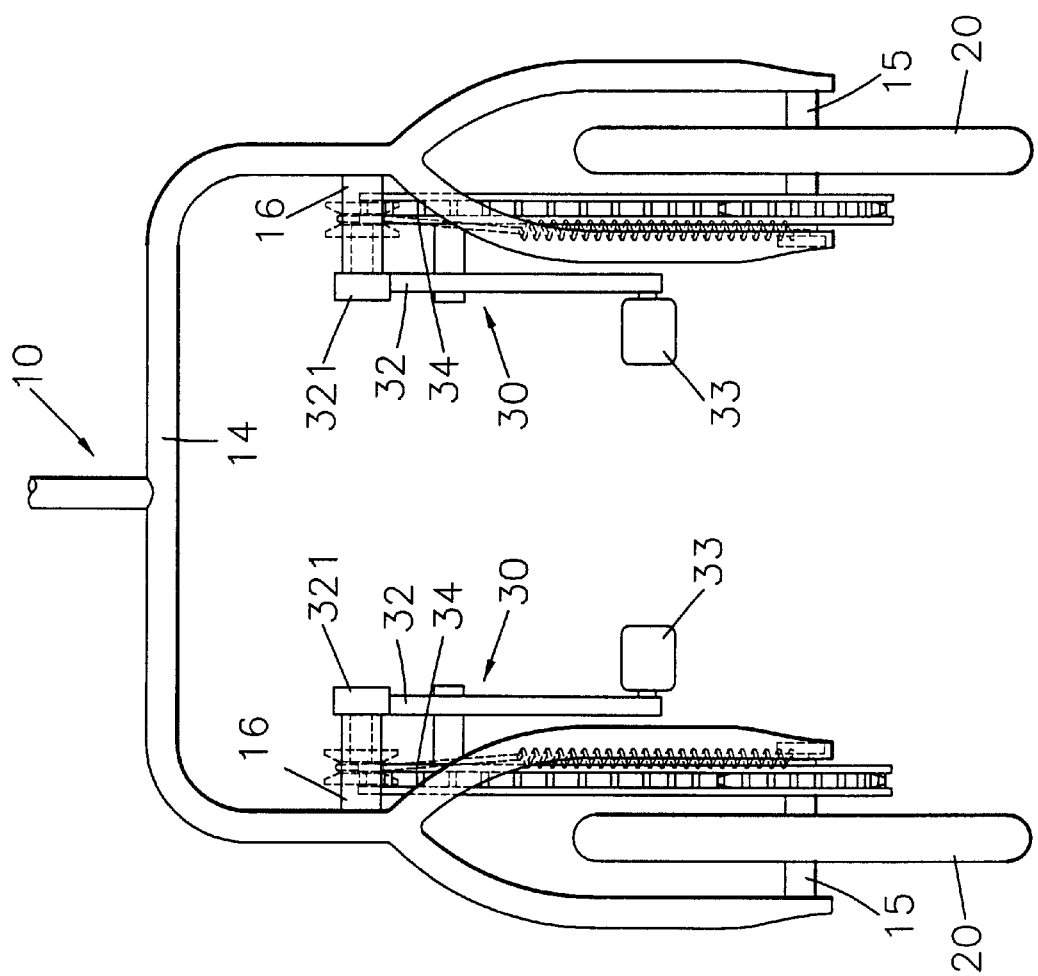
FIG. 2 is a top view of the rear portion of the present invention.

Referring to FIGS. 1 and 2, an improved exerciser bike in accordance with the present invention comprises:

a frame 10 including a front portion 11 having a front wheel 12 and a handle 13 for steering the front wheel 12, and including a rear portion 14 having two rear wheel axles 15;

two rear wheels 20 rotatably secured to the rear wheel axles 15; and two treadle-typed driving means 30 for driving the rear wheels 20 separately. The improved exerciser bike is allowed to be turned with the rear wheels 20 when the rear wheels 20 are actuated with different speeds with the two driving means 30.

Regarding these two driving means 30, each includes:

(a) a one-way ratchet sprocket wheel 31 secured on the rear wheel axles 15;

(b) a L-shaped foot support 32 having a middle portion 321 pivotally coupled to the frame 10 at a pivot shaft 16 and having a first end 322 and a second end 323, a pulley 37 being disposed on said second end 323;

(c) a foot pedal 33 secured on the first end 322 of the foot support 32; and (d) a chain 34 engaged on the ratchet sprocket wheel 31 and having a first end 341 secured to a predetermined point 324 of the foot support 32 and a second end 342 first connected to a wire element 36 (such as a steel wire or a rope) which winds on said pulley 37 and then connected to a resilient element 35 (such as a spring) and finally secured to an extension rod 17 of the frame 10, for allowing the rear wheels 20 and the ratchet sprocket wheels 31 to be driven by the foot supports 32 via the chains 34.

Figure 3:
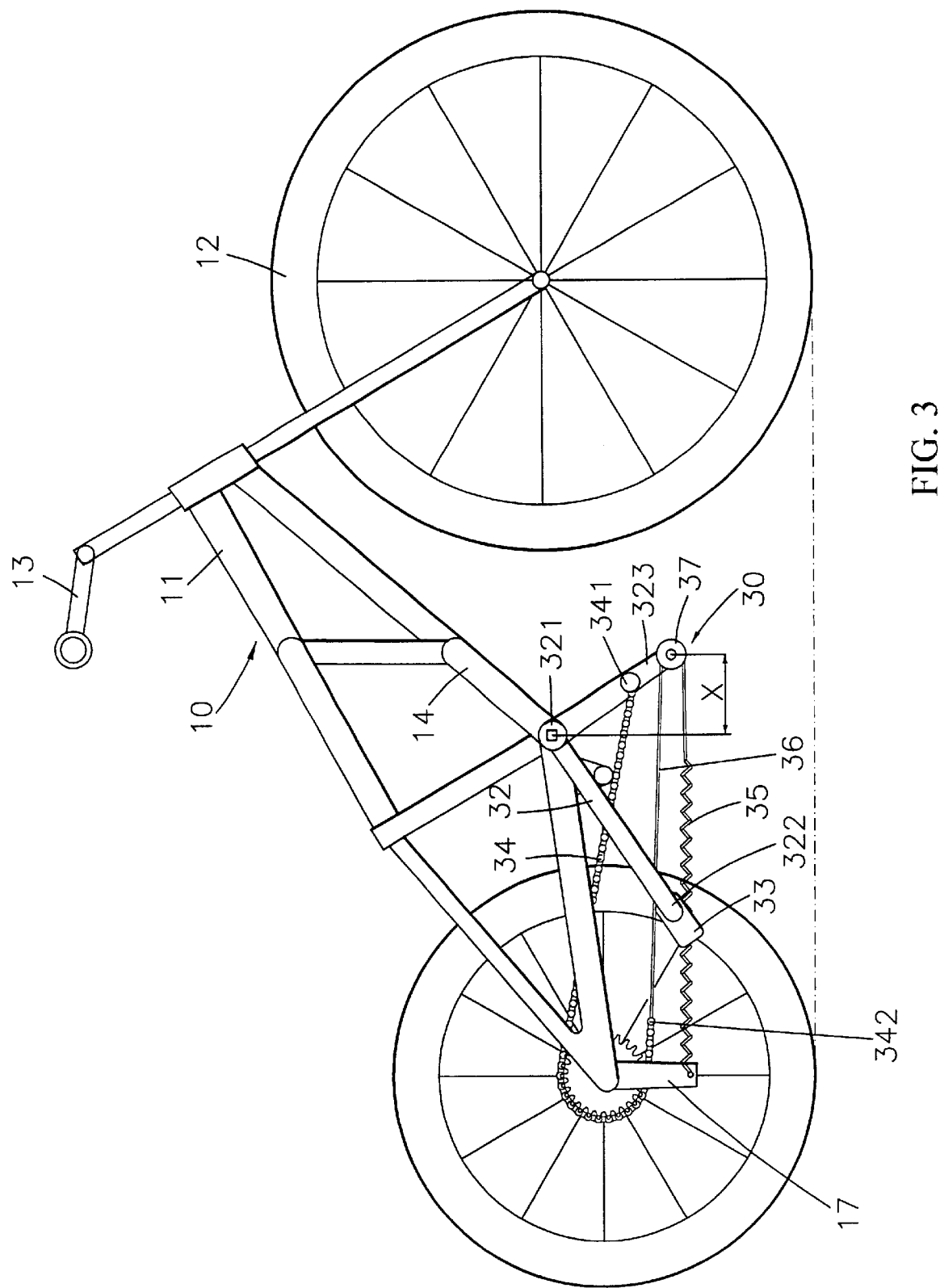
FIG. 3 is a side view illustrating the operation of the improved exerciser bike.
Figure 4:
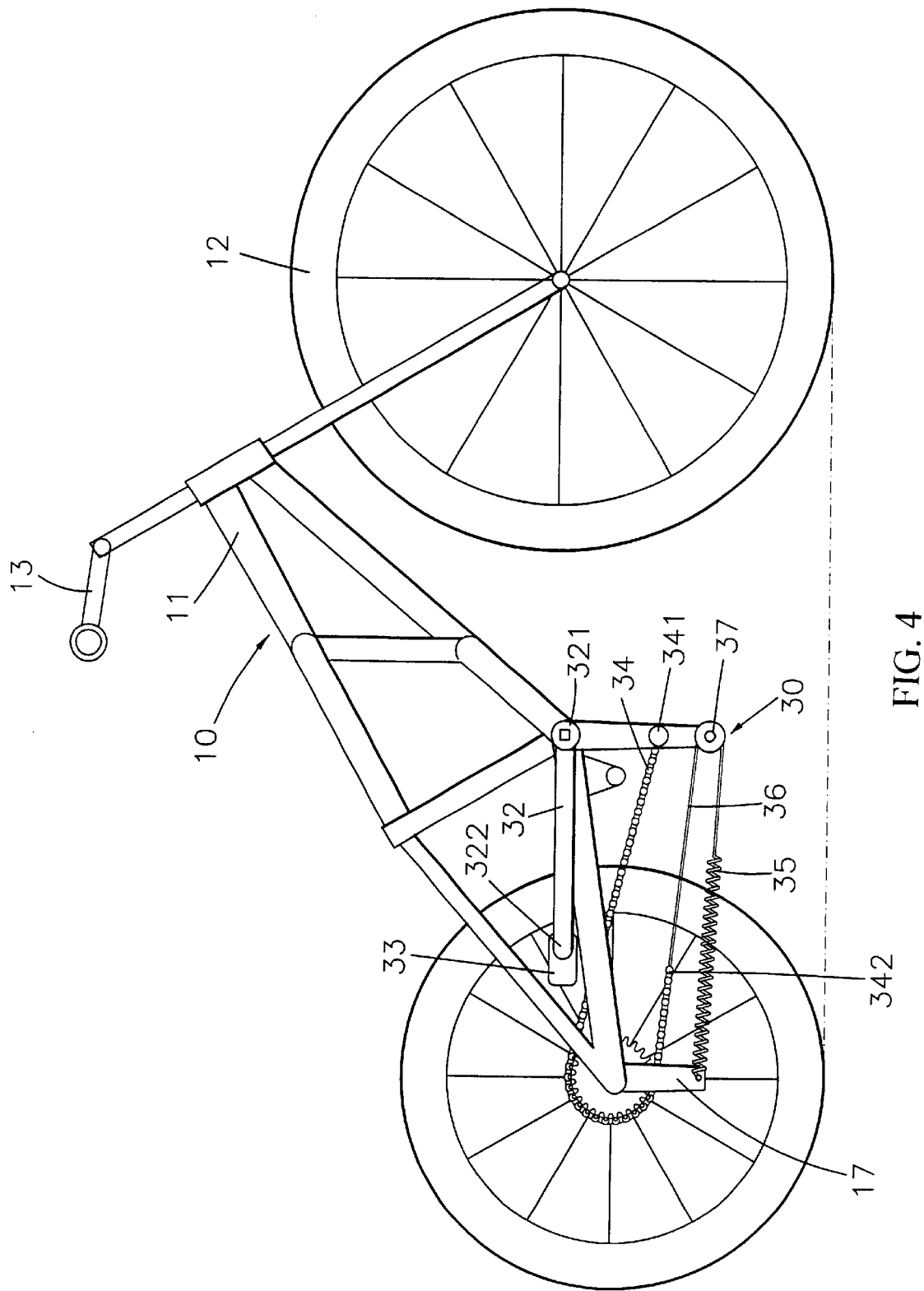
FIG. 4 is another side view illustrating the operation of the improved exerciser bike.

In operation, as shown in FIG. 3, when the user steps on one of the foot pedals 33 and rotates the L-shaped foot supports 32 about the pivot shaft 16, the resilient element 35 is drawn and extended (storing energy). When the user lift up his foot as shown in FIG. 4, the resilient element 35 will become the original state (releasing energy) and the foot pedal 33 will move up. At this moment, the chain 34 will drive the one-way ratchet wheel 31 to rotate and make the rear wheel 20 rotate. Therefore, by repeating this kind of step down and lift up, the treadle-typed movement can make this tricycle move. This is totally different to the conventional rotary-typed movement.

Furthermore, because the chain 34 is first connected to the wire element 36 (such as a steel wire) which winds on said pulley 37 and then connected to the resilient element 35 (such as a spring or the like), the total length of the resilient element can be designed to be longer than before. That is, the maximum extended length (after pulled) of the resilient member 35 can be equal to the distance between the extension rod 17 to the pulley 37. Thus, while designing the resilient element 17 of the driving means 30, it is more flexible.

In addition, please refer to FIG. 3. When the second end 323 of the L-shaped foot support 32 moves a distance X, the total length of the chain 34, wire element 36 and resilient element 35 will extend approximately a distance of 3X. With regard to the resilient element 35, the distance pulled out is almost tripled (this invention moves 3X; the prior art only moves X). Therefore, the pulling force is greater than the one of the prior art.

Besides, the resilient element 35 with longer length usually has a higher allowable load. If the work load is the same, the life of the resilient element 35 with longer length will be longer than the life of resilient element 35 with shorter length.

Thus, a repeated up-and-down treading exercising is achieved and the user's body can be kept straight up (like walking). Moreover, during the exercising, the user's head, chest, and waist (especially the spine) are almost kept straight. So, it can significantly reduce the possibility of injury to the spine.

It is to be noted that the two foot supports 32 are coupled to the rear wheels 20 respectively and are not coupled together with each other such that the rear wheels 20 may be driven separately by the two driving mechanisms 30. The two rear wheels 20 may be driven with different speeds such that the improved exerciser bike may be easily turned left or right. Alternatively, the chains 34 and the sprocket wheels 31 may be replaced by belts and pulleys.

Accordingly, in this invention, by utilizing the special design of pulley and wire element, the length of the resilient element can be designed to be longer and the restoring force as well as the life of the spring is tripled or magnified. Also, it allows the improved exerciser bike to be easily turned with the rear wheels. So, this invention is safe, stable and easy to be controlled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An improved exerciser bike comprising:
    a frame including a front portion having a front wheel and a handle for steering the front wheel, and including a rear portion having two rear wheel axles;
    two rear wheels rotatably secured to the rear wheel axles; and
    two treadle-typed driving means for driving the rear wheels separately;
    wherein each driving means includes:
        (a) a one-way ratchet sprocket wheel secured on the rear wheel axles;
        (b) a foot support having a middle portion pivotally coupled to the frame at a pivot shaft and having a first end and a second end, a pulley being disposed on said second end;
        (c) a foot pedal secured on the first end of the foot support; and
        (d) a chain engaged on the ratchet sprocket wheel and having a first end secured to a predetermined point of the foot support and a second end first connected to a wire element which winds on said pulley and then connected to a resilient element and finally secured to an extension rod of the frame, for allowing the rear wheels and the ratchet sprocket wheels to be driven by the foot supports via the chains.

2. The improved exerciser bike according to claim 1, wherein said wire element is a steel wire and said resilient element is a spring.

3. The improved exerciser bike according to claim 1, wherein foot support is L-shaped and the predetermined point is at a point between the middle portion and the second end of the foot support.

* * * * *